United States Patent [19]

Rodgers

[11] 3,957,293

[45] May 18, 1976

[54] AIR HOSE

[75] Inventor: Frank J. Rodgers, Fanwood, N.J.

[73] Assignee: Nycoil Company, Fanwood, N.J.

[22] Filed: Apr. 1, 1974

[21] Appl. No.: 456,628

[52] U.S. Cl. .............................. 285/174; 285/249; 285/281

[51] Int. Cl.² ........................................ F16L 55/00

[58] Field of Search .......... 285/174, 276, 321, 272, 285/275, 280, 281, 382.4, 349, 334.4, 249

[56] References Cited
UNITED STATES PATENTS

| | | | |
|---|---|---|---|
| 1,153,824 | 9/1915 | Pierce | 285/98 |
| 1,862,833 | 6/1932 | Stover | 285/249 |
| 2,253,018 | 8/1941 | Cowles | 285/276 |
| 2,570,406 | 10/1951 | Troshkin et al. | 285/281 |
| 3,262,718 | 7/1966 | Droudt | 285/280 X |
| 3,278,204 | 10/1966 | Currie | 285/281 |
| 3,413,017 | 11/1968 | Hughey | 285/334.4 X |
| 3,773,360 | 11/1973 | Timbers | 285/307 |

FOREIGN PATENTS OR APPLICATIONS

| | | | |
|---|---|---|---|
| 17,361 | 3/1956 | Germany | 285/233 |
| 1,301,633 | 7/1962 | France | 285/249 |

*Primary Examiner*—Dave W. Arola
*Attorney, Agent, or Firm*—Holland, Armstrong, Wilkie & Previto

[57] ABSTRACT

A recoilable air hose having a two-piece swivel fitting.

8 Claims, 4 Drawing Figures

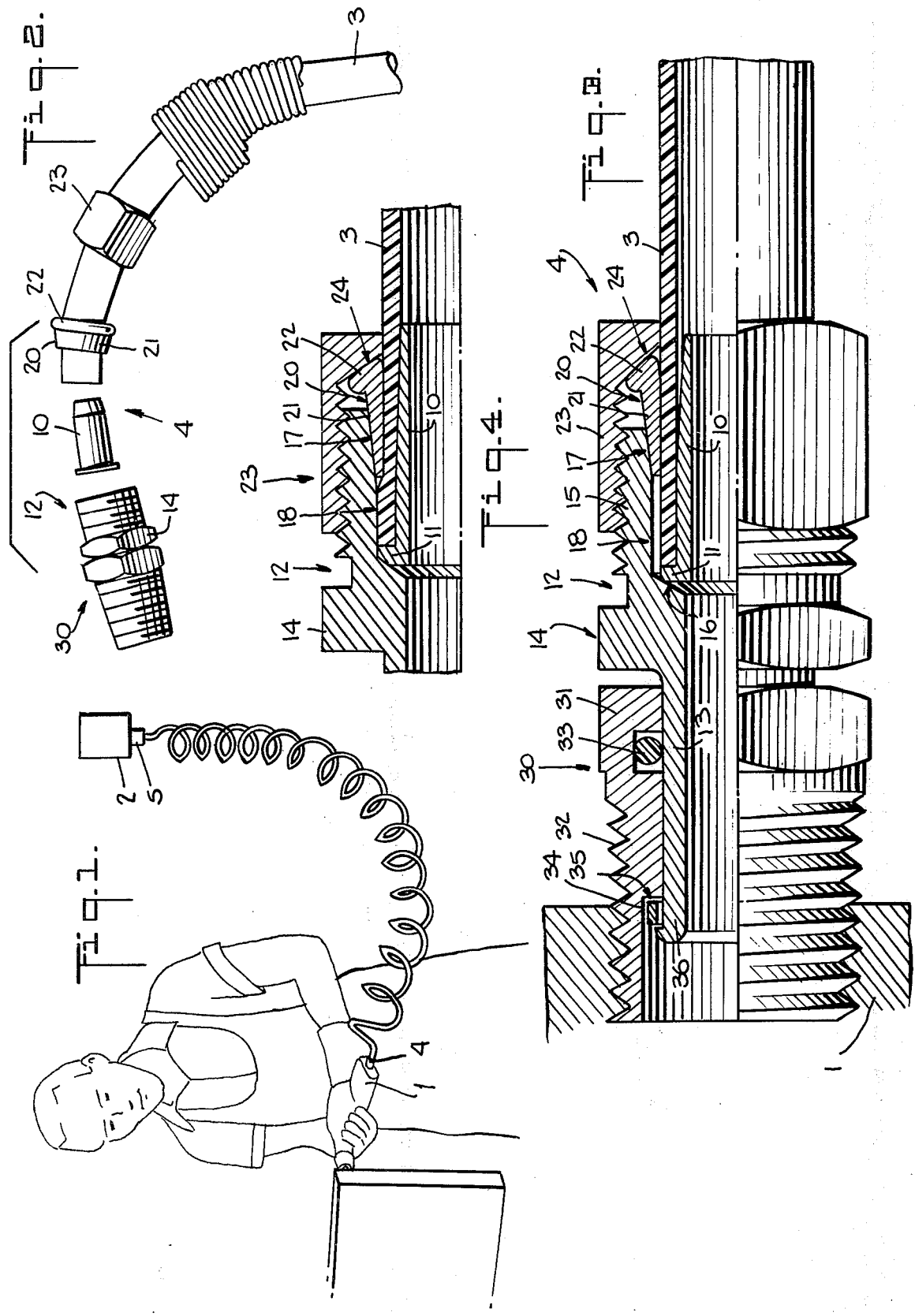

AIR HOSE

DESCRIPTION

The present invention is directed to an improved air hose and more particularly an improved retractable air hose which has a swivel fitting thereon.

Retractable air hoses have been used for a number of years in connection with air tools. The air tools are mounted at one end of a retractable air hose and the other end of the hose is attached to a source of air or some other fluid. This permits the air to be directed from the source to the air tool through the air hose. When the use of the air tool is finished, the air hose will retract to its original position. Such as a retractable air hose is shown in U.S. Pat. No. 3,021,871 dated Feb. 20, 1972.

It has been found that in moving the air tool around during use, great stress is applied to the end of the air hose which is attached to the air tool so that the air hose may bend to reduce the amount of air passing there through or it may crack or it may break entirely.

The present invention avoids these drawbacks and has for one of its objects an improved fitting for an air hose which will not cause the hose to break.

Another object of the present invention is the provision of an improved retractable air hose which has an improved swivel fitting thereon.

Another object of the present invention is the provision of a fitting which will not permit any torque to be applied to an air hose so as to prevent the end of the tube from being bent or broken.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 1 is a diagramatic view of the invention in use;

FIG. 2 is an exploded view of the invention;

FIG. 3 is a sectional view showing the various parts of the invention; and

FIG. 4 is a detail similar to FIG. 2.

Referring more particularly to the drawings, a phneumatic tool 1 is fed from a source of fluid 2 by a retractable air hose 3 which has a plurality of coils which permits it to retract which is described in greater detail in U.S. Pat. No. 3,021,871. Air hose 3 is connected at one end to the source 2 at its other end and to the tool 1 by coupling assemblies or fittings 5 and 4, respectively.

Preferably, the fitting 4 is a swivel coupling, the details of which will be described hereinbelow. If desired, the coupling 5 may also be swivel coupling similar to the construction of coupling 4.

The coupling or fitting 4 comprises a hose supporting insert member 10 for the hose 3 which is mounted within the end of the hose 3 and which has an upstanding flange 11 to act as a stop for the hose 3.

A hollow inner body portion 12 comprises a forwardly extending locking area 13 at one end, a central nut area 14 and a rearwardly extending threaded area 15.

The end of the hose 3, together with the supporting member 10 is adapted to be mounted within the hollow cylindrical inner area 18 of the threaded portion 15 of the inner member 12. Preferably, the flange 11 is adapted to strike the inner shoulder 16 of the threaded member 15 to prevent any further forward movement of the hose 3 and the support member 10.

A beveled locking ferrule 20 is interposed between the hose 3 and the inner beveled surface 17 of the threaded portion 15 of the inner member 12. The beveled locking ferrule 20 has a beveled front portion 21 and a rear heel portion 22.

An outer locking nut 23 having an angled inner bearing wall 24 is adapted to apply pressure to the heel 22 of the ferrule 20 when it is threadedly mounted on to the threaded body portion 15 of the inner member to squeeze the hose 3 between it and the element 10 to securely hold the hose 3 in place.

The inner body member 12 has a hollow forward extension 13 adapted to be inserted within a hollow outer member 30. The outer hollow member 30 has a nut portion 31 and a threaded section 32. The threaded section 32 is adapted to be threaded onto the hand tool 1 or the source of fluid as the case may be. An "O" ring 33 is inserted between the outer body member 30 and the inner tube 13.

The hollow inner surface is countersunk to form a locking shoulder 35 adapted to cooperate with a locking lip 36 formed in portion 13 to lock the inner and outer members together. A retainer ring 34 is inserted between the shoulder 35 in the outer member and the lip 36 of the body member 13 in the threaded portion of the inner tube.

The lip 36 of the inner body portion 13 is adapted to be flared outwardly over the retainer ring 34. This permits the inner body member 13 to be locked in place within the outer member 30 between lip 36 and shoulder 35. The flare 36 can be formed after the retainer ring 34 is in place.

It will be seen that the outer and inner members can be turned relative to each other without separating. Hence, the air hose 3 can swivel relative to the hand tool 1 or the source 2, as the case may be, without any torque or pressure being applied to the nylon tube.

Therefore, it will be seen that the present invention provides an improved retractable air hose which is provided with an improved swivel fitting to prevent any bending or crimping or other damage to the hose.

As many and varied modifications of the subject matter of this invention will be become apparent to those skilled in the art from the detailed description given herein above, it will be understood that the present invention is limited only as provided in the claims appended hereto.

What is claimed is: portion locking

1. A swivel fitting comprising a hollow outer member and a hollow inner member, the inner member having a portion extending from one end and mounted within the outer member, a locking element means on said portion and cooperating with said outer member to hold the two members together, said outer member being countersunk to provide an internal shoulder, said locking element means on said inner member comprising an outwardly extending lip and a locking member interposed between said internal shoulder and lip cooperating with said shoulder to hold the two elements together, a seal between said inner and outer members and in direct contact with both, said outer member being provided with a circular channel to accommodate said seal, the inner surface of the outer member and the outer surface of the inwardly extending potion of the inner member between said locking element and said seal being elongated and in substantial contact with each other to prevent the two from wobbling relative to each other, said inner member having a hose clamping mechanism extending from the other end which comprises an inwardly tapered inner supporting element and an outer ferrule adapted to hold a hose therebetween, said inner supporting element having an outwardly extending stop shoulder, said inner member having a stop shoulder and the inner supporting element having a front stop on said outwardly extending stop shoulder against which the stop shoulder of said inner member abuts, said ferrule having an outer beveled surface and a rear heel, the inner member having a beveled bearing surface adapted to bear against the beveled surface of the ferrule, and a locking nut mounted over the outer member and having a portion adapted to bear against the heel of the ferrule.

2. A hose as claimed in claim 1 wherein said seal is an O-ring.

3. A swivel fitting as claimed in claim 1 wherein said lip is an outwardly flared portion of the inner member.

4. A swivel fitting as claimed in claim 3 wherein said seal is an O-ring.

5. A swivel fitting as claimed in claim 3 wherein said locking member is a locking ring.

6. A hose having a swivel fitting mounted at one end, said swivel fitting comprising a hollow outer member and a hollow inner member, the inner member having a portion extending from one end and mounted within the outer member, a locking element means on said portion and cooperating with said outer member to hold the two members together, said outer member being countersunk to provide an internal shoulder, said locking element means on said inner member comprising an outwardly extending lip and a locking member interposed between said internal shoulder and lip cooperating with said shoulder to hold the two elements together, a seal between said inner and outer members and in direct contact with both, said outer member being provided with a circular channel to accommodate said seal, the inner surface of the outer member and the outer surface of the inwardly extending portion of the inner member between said locking element and said seal being elongated and in substantial contact with each other to prevent the two from wobbling relative to each other, said inner member having a hose clamping mechanism extending from the other end which comprises an inwardly tapered inner supporting element and an outer ferrule adapted to hole a hose therebetween, said inner supporting element having an outwardly extending stop shoulder, said inner member having a stop shoulder and the inner supporting member having a front stop on said outwardly extending stop shoulder against which the stop shoulder of said inner member abuts, said ferrule having an outer beveled surface and a rear heel, the inner member having a beveled bearing surface adapted to bear against the beveled surface of the ferrule and a locking nut mounted over the outer member and having a portion adapted to bear against the heel of the ferrule.

7. A hose as claimed in claim 6 wherein said lip is an outwardly flared portion of the inner member.

8. A hose as claimed in claim 7 wherein said locking member is a locking ring.

* * * * *